(No Model.)
S. C. COBB.
DISK SHARPENER.
No. 435,599. Patented Sept. 2, 1890.
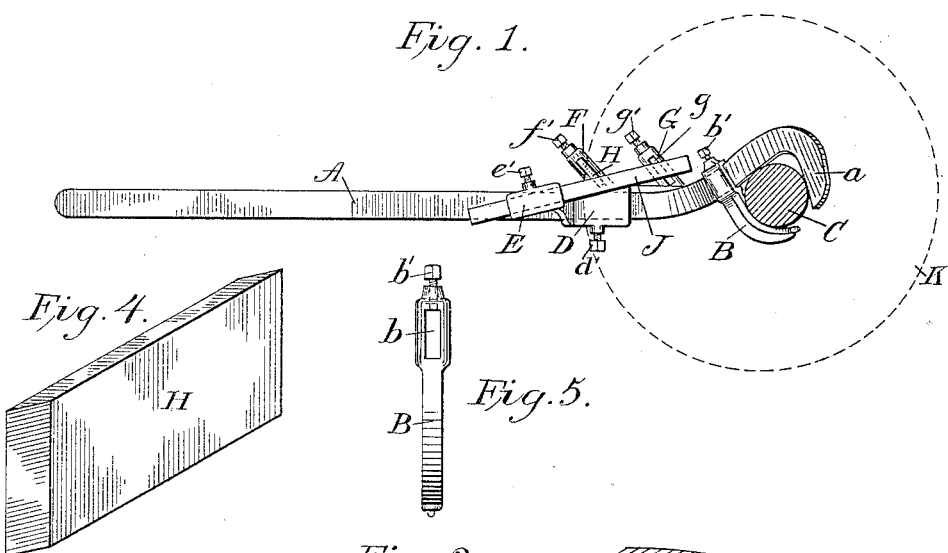
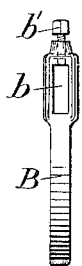
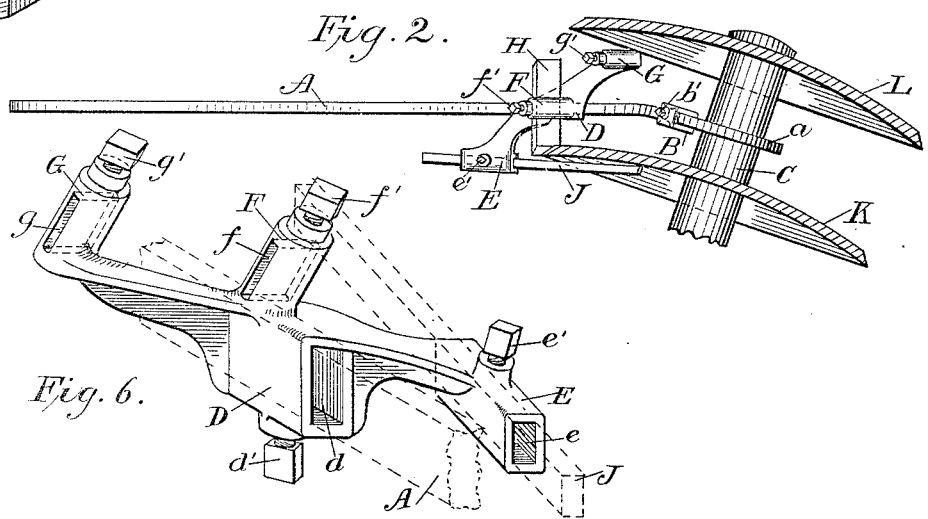
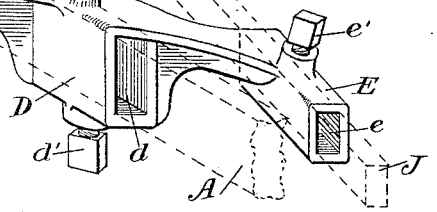
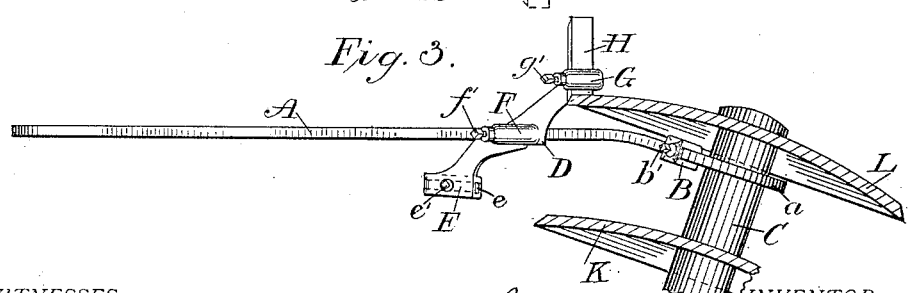
WITNESSES:
John W. Fisher
William Kirk
INVENTOR
Samuel C. Cobb
BY
Robert W. Hardie
ATTORNEY.

UNITED STATES PATENT OFFICE.

SAMUEL C. COBB, OF JANESVILLE, WISCONSIN.

DISK-SHARPENER.

SPECIFICATION forming part of Letters Patent No. 435,599, dated September 2, 1890.

Application filed December 19, 1889. Serial No. 334,325. (No model.)

*To all whom it may concern:*

Be it known that I, SAMUEL C. COBB, a citizen of the United States, residing at Janesville, in the county of Rock and State of Wisconsin, have invented certain new and useful Improvements in Disk-Sharpeners, of which the following is a specification.

The object of my invention is to provide a disk-sharpener which will be adapted to sharpen the cutting-edge of a harrow-disk of any size in diameter without removing the disk from the frame upon which it is mounted. This I accomplish by substantially the means illustrated in the accompanying drawings, in which—

Figure 1 represents the side view of a sharpener embodying my invention connected to an axle upon which the disk is mounted. Fig. 2 represents a plan view of the same together with disks secured to an axle. Fig. 3 represents a plan view of the sharpener arranged to sharpen the end disk of a gang. Fig. 4 represents a perspective view of a sharpening-blade detached from its holder. Fig. 5 represents an end view of a clamping-jaw. Fig. 6 represents a perspective view of a cutter-head enlarged and removed from the main bar.

A represents a main bar bent downward at its forward end so as to form a hook adapted to engage with the axle of a harrow. This curved-forward end is bent upward and to one side from the main bar. The forward portion of the main bar is provided with a clamping-jaw B, having its lower portion curved downward and forward, and provided on its upper end with a slot $b$, by means of which the jaw is made movable on the bar lengthwise thereof. A cutter-head D is attached to the main bar and made adjustable thereon by means of a slot $d$ formed in the cutter-head, through which the shank of the main bar passes. The cutter-head is secured immovably in position on the bar, when desired, by means of the set-screw $d'$. Cutter-posts F and G are formed on the cutter-head, each of said posts being provided with a slot—such as $f$—extending transversely to the main bar and formed in a plane inclined to the horizontal plane of said bar, so that when the sharpening-blade H is secured in either of said posts it will assume a corresponding position with respect to the plane of said main bar and produce a shearing cut on the edge of the disk. The end of the sharpening-blade H is beveled so as to form on said end a sharp cutting-edge. I prefer to sharpen both ends of the blade, so that the ends may be reversed when one becomes worn. A guide-holder E is shown formed on a lateral extension of the cutter-head, and provided with a slot $e$, extending lengthwise of the holder, and adapted to hold the guide-bar J in position and to permit said bar to be adjusted in the direction of its length. The bar is secured in position in the holder, when desired, by means of the set-screw $e'$.

The sharpener is adjusted for use by placing the bifurcated forward end in engagement with the axle of the harrow, as shown in Fig. 1. The jaw B, being adjustable on the bar, may be brought up to within any desired distance from the downwardly-projecting forward end $a$ of the bar, so as to fit snugly upon axles varying in size. When the forward end of the main bar has been secured to the axle, the cutter-head D is moved along the main bar until the edge of the sharpening-blade is opposite the edge of the disk. The handle of the main bar is then inclined laterally to give the desired bevel to the edge of the disk, and the guide-bar J moved inward until its forward end comes in contact with the concave side of the disk, as shown in Fig. 2. The guide-bar when in this position serves as a brace or fulcrum, and prevents the forward end of the main bar from changing its position on the axle, and consequently from changing the angled position of the sharpening-blade. When the parts are in the position described, the rear end of the main bar, which serves as a handle, is then pressed sidewise until the edge of the scraping-blade bears heavily against the edge of the disk, and is then drawn downward along said edge. A succession of similar movements of the handle will result in producing a sharp cutting-edge on the disk.

The degree of pitch or bevel to be formed on the edge of the disk may be regulated by moving the forward end of the main bar either up to or away from the side of the disk which is being sharpened. When the forward end is moved a considerable distance from said convex side, as shown in Fig. 2, a slight bevel will be formed on the edge of the disk, and the nearer said forward end is brought toward the convex side of the disk the more gradual will be the inclination of the bevel formed. Where the axle does not extend beyond the convex side of the disk, as shown in Fig. 3, the forward end of the main bar is placed nearest the concave side of the disk, as shown in said figure, and the sharpening-blade is secured in the offset cutter-post G, the guide-bar J in such cases being dispensed with. The forward end of the main bar may in all cases be placed nearest to the concave side of the disk and the guide-bar be dispensed with. I prefer, however, to use the construction and arrangement shown in Fig. 2 when possible. By means of the adjustability of the cutter-head lengthwise of the bar the sharpener is readily adapted to be applied to a disk of any size in use.

I do not desire to be limited to the specific construction shown of the several parts, for, so far as I am aware, I am the first to construct a disk-sharpener wherein the sharpening-blade is set to give the desired bevel to the edge of a disk by drawing the free rear end of the main bar in a lateral direction, thereby moving the forward end of said bar either toward or from the face of the disk, especially when the bar is held in position by means of a guide-bar having its forward end in contact with the concave side of the disk. It is evident that a cutter-head similar to that shown herein may be used on a main bar substantially different in construction to the one shown.

What I claim is—

1. The combination of a main bar adapted to be adjustably secured to a disk-gang axle, a cutter-head secured to the main bar and extending outward therefrom so as to overlap the edge of a disk, and a sharpening-blade secured to the overlapping end of the cutter-head, whereby when in use the main bar is arranged on one side of a disk and the sharpening-blade on the opposite side of the same, substantially as shown, for the purpose specified.

2. The combination, with a main bar, of a cutter-head adjustable lengthwise of the bar and extending outward therefrom so as to overlap the edge of a disk, and a sharpening-blade secured to the overlapping end of the cutter-head, whereby when in use the bar is arranged on one side of the disk and the sharpening-blade on the opposite side, substantially as shown and described, for the purpose specified.

3. The combination, in a disk-sharpener, of a main bar, a cutter-head adjustably secured thereto and provided with a sharpening-blade and a guide-bar adjustable in the direction of its length, substantially as shown and described.

4. The combination, in a disk-sharpener, of a main bar having an adjustable bifurcated forward end adapted to grasp the axle of a disk-gang, and a cutter-head adjustably secured to said bar and provided with a guide-bar secured in a holder formed on a lateral extension of the cutter-head, and a sharpening-blade secured in a cutter-post and arranged with its cutting-edge facing the guide-bar, substantially as shown and described.

5. The combination of a main bar, a cutter-head provided with a slot engaging with the main bar and with cutter-posts having slanting slots adapted to hold a sharpening-blade, and a guide-bar adjustable lengthwise and secured in a holder formed on the cutter-head, substantially as shown and described.

6. The combination of the main bar A, having a downwardly-projecting forward end a, the adjustable clamping-jaw B, and the cutter-head D, provided with cutter-posts F and G and with the guide-holder E and the guide-bar J, adjustably secured in said holder, substantially as shown and described.

SAMUEL C. COBB.

Witnesses:
 ROBERT W. HARDIE,
 WILLIAM RUGER.